United States Patent

[11] 3,578,339

[72] Inventor William F. Summerfield
Huntington Beach, Calif.
[21] Appl. No. 805,942
[22] Filed Feb. 17, 1969
[45] Patented May 11, 1971
[73] Assignee Mattel, Inc.
Hawthorne, Calif.

[54] TONE ARM ASSEMBLY IN A TOY SOUND REPRODUCING DEVICE
12 Claims, 5 Drawing Figs.

[52] U.S. Cl. .......... 274/9, 274/15B
[51] Int. Cl. .......... G11b 3/00, G11b 3/62, G11b 3/10
[50] Field of Search .......... 274/1, 9, 13—15, 24, 23

[56] References Cited
UNITED STATES PATENTS

| | | | |
|---|---|---|---|
| 1,453,966 | 5/1923 | Yungstrom .......... | 274/15(.2) |
| 1,673,235 | 6/1928 | Fageol .......... | 274/15(.2) |
| 3,245,688 | 4/1966 | Ryan .......... | 274/1(.1) |
| 3,452,991 | 7/1969 | Rabe .......... | 274/15 |

FOREIGN PATENTS

| | | | |
|---|---|---|---|
| 103,523 | 1/1916 | Great Britain .......... | 274/15 |

*Primary Examiner*—Harry N. Haroian
*Attorney*—Seymour A. Scholnick

ABSTRACT: A tone arm assembly, including a stylus which is supported in a rolling block, for use in a toy sound reproducing device, of the type in which a sequence of sounds, representing a saying or the like is reproduced during Play, when the stylus follows in a sound groove in a record, rotatable in a Play direction. The rolling block is shaped and the stylus supported therein, so that when the record is rotated in the Rewind direction, opposite the Play direction, the moving record causes the block to pivot so that a rounded part thereof, rather than the stylus, engages the record as the arm is pivoted toward a Start of Play position. When the record starts turning in the Play direction, it pivots the block so that when the stylus finally engages a groove, the block is locked in a Play direction to enable the stylus to follow the engaged groove.

INVENTOR
WILLIAM F. SUMMERFIELD

BY Max E. Shirk
ATTORNEY

TONE ARM ASSEMBLY IN A TOY SOUND REPRODUCING DEVICE

BACKGROUND OF THE INVENTION

1. Field of the Invention

The present invention relates to sound reproducing devices in toys and, more particularly, to an improved stylus-supporting tone arm assembly, incorporated in such devices.

2. Description of the Prior Art

The use of sound reproducing devices in toys, in order to produce talking toys, is well known. Typically, such a sound reproducing device, which is concealably mounted in a toy, includes a disclike record or tape, in which a plurality of sayings are recorded. When a disclike record is employed the sayings are recorded in separate, independent sound grooves. Generally, the record has an exposed side with a plurality of congruate spiral grooves extending from outer peripheral radial points to inner radial points. The device also includes a tone arm which fixedly supports a needle or stylus, whose function is to produce mechanical signals whenever it is engaged in one of the sound grooves and follows therein as the record turns or rotates in a selected direction, known as the Play direction. The mechanical signals are used, in an associated diaphragm, to produce audio signals which form the saying, recorded in the sound groove which is followed by the stylus. The tone arm is generally biased toward the record, to urge the stylus to engage one of the grooves.

The record is generally supported on a spindle-mounted turntable. A spring motor, generally in the form of a rewindable spiral spring is coupled to the spindle. Manually operable means, such as a drawstring, is connected to the spindle. When the string is drawn or pulled, the spindle turns or rotates in a first direction causing the spring to wind up. Thus, the string pulling represents a Rewind operation. In most prior art devices, the string is also used, during Rewind, to move the tone arm from a radially inward position, which the arm assumes at the end of Play of a saying, to a radially outward position in which the stylus is in a position to engage an outer point of a groove which it is to follow during a subsequent Play cycle.

The moving of the tone arm from the inward position to the outward position, is generally accomplished by passing the string through or under the tone arm so that when the string is pulled it first biases the arm away from the record, thereby disengaging the stylus from the groove. Then, as the string pulling continues, the tone arm swings radially outwardly to the outward position. When the string is released, which represents the start of Play, the string is slack so that the arm is free to assume its biased position toward the record, causing the stylus to engage one of the grooves. Also, as the string is released, the power spring is free to unwind. As it unwinds, it rotates the spindle and the turntable on which the record is mounted, in a second direction, representing the Play direction. It is during the rotation of the record in the Play direction that one of the recorded sayings is reproduced.

As in a conventional record player, in order to reproduce sounds, recorded on a record, of reasonable fidelity or quality, it is necessary to protect the record from being scratched by any sharp or pointed object, such as the stylus. The danger of record scratching in a sound reproducing device in a toy is particularly great since such a device is generally operated by playing children, who typically do not treat toys with extra care. Moreover, in a sound reproducing device, used in a toy a straight acoustic sound reproducing system is typically employed. In such a system stylus pressure in the range of 60 to 90 grams are quite common. Under such pressure conditions, any record scratching by the stylus will more than likely result in permanent damage to the record. Thus, a need exists for improvements in the design of a sound reproducing device for use in a toy to minimize the likelihood of record scratching by the sharp stylus even when the device is operated under adverse conditions.

OBJECTS AND SUMMARY OF THE INVENTION

A primary object of the present invention is to provide improvements in a sound reproducing device of the type used in a toy.

Another object of the present invention is to provide an improved tone arm assembly for use in a toy-mounted sound reproducing device to minimize the likelihood of damage to a record, forming part of such a device.

A further object is the provision of an improved novel arrangement for supporting a stylus by a sound reproducing device's tone arm, so as to minimize the likelihood of contact between the stylus and the record surface, other than during actual sound reproduction.

Still another object of this invention is to provide a novel tone arm assembly, used to support a stylus, in a way whereby the stylus is inhibited from contacting the record during Rewind and is operable to come into contact with any of the record's grooves only when the record is rotated in the Play direction.

These and other objects of the invention are achieved by providing a tone arm assembly which includes a stylus, fixedly supported in a block which is in turn pivotally supported by the tone arm. Such an arrangement differs materially from prior art tone arm assemblies in which the styli are fixedly supported by tone arms. In the tone arm assembly of the present invention the block in which the stylus is fixedly supported, and which will hereafter be referred to as the rolling block, is pivotally supported by the tone arm so that at the start of Rewind, initiated by the pulling of the drawstring or the like, as the record turns in the Rewind direction, and the arm is caused to pivot to an outward position one or more forces are applied to the stylus and/or the arm. As a result, the rolling block pivots with respect to the tone arm to move the stylus away from the record and expose a blunt block surface, hereafter referred to as the shoe, which engages the record surface as the arm moves to its outward position, which it assumes at the end of Rewind, or start of Play.

As long as the drawstring is taut the shoe of the rolling block remains in contact with the record surface. Once, however, the string is released and the record is free to rotate in the Play direction, representing the start of Play, the rotating record applies a force to the shoe of the rolling block, to pivot the block and to bring the stylus into contact with the record surface. When a groove comes into contact with the stylus, the rolling block is pivoted into a selected fixed position in which the stylus is capable of being in contact with and to follow in the groove in which a saying is recorded.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
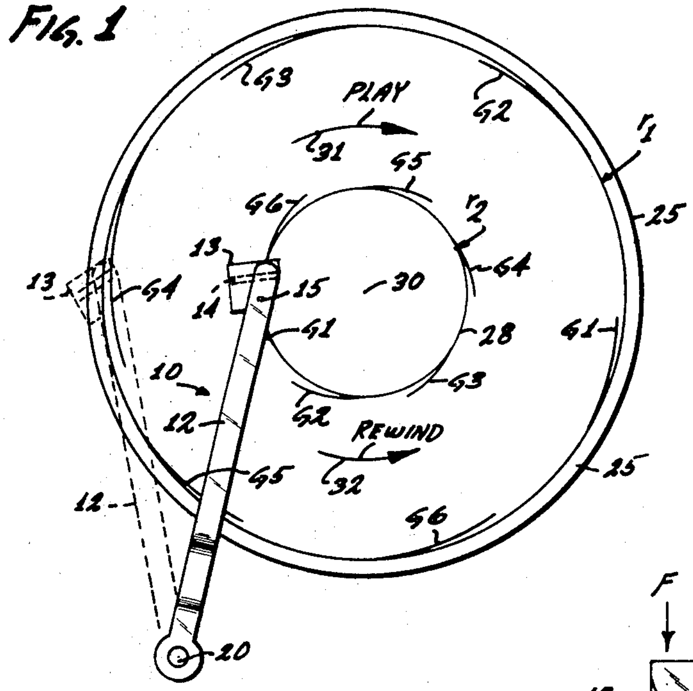
FIG. 1 is a top view of portions of a sound reproducing device, needed to explain the present invention.
Figure 2:
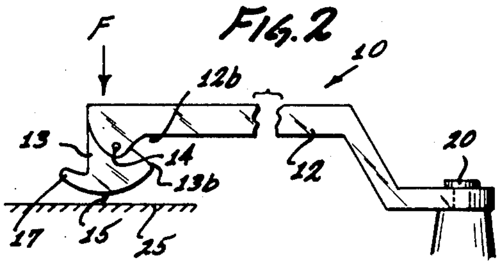
FIG. 2 is a side view of the novel tone arm assembly of the present invention.

Reference is now made to the FIGS. and particularly to FIG. 1 which is a simplified top view of those parts of a sound reproducing device, which are necessary to explain the novel tone arm assembly of the present invention. A side view of the assembly is shown in FIG. 2. In these FIGS. numeral 10 designates the assembly which includes a tone arm 12 and a rolling block 13 which is pivotally supported by the arm by a pivot 14. The block 13 which fixedly supports a stylus 15, has a curved blunt surface portion, hereafter defined as shoe 17. The tone arm 12 is pivotally supported by a pivot 20. The arm 12 is assumed to be biased continuously toward a multigroove record 25 (FIG. 1) by a force designated in FIG. 2 by arrow F.

As in many prior art sound reproducing devices the record 25 defines a plurality of congruate spiral grooves in which sound sequences or sayings are recorded. In FIG. 1 six spiral sound grooves G1—G6 are partially diagrammed. Each groove is assumed to have a start point at a radial distance $r_1$, from the record's center 30, and an end point at a radial distance $r_2$. The end points may all be in communication with a common inner circular groove 28.

As in prior art sound reproducing devices, the record is rotatable about its center 30 in either of two opposite directions, hereafter referred to as the Play direction, designated in FIG. 1 by arrow 31, and as the Rewind direction, designated by arrow 32. While the record is rotatable in either of the two directions, the tone arm 12 is pivotable between two positions. At the end of Play, after the reproduction of a saying, the arm is in an inward position, represented in FIG. 1 by the solid lines. During Rewind, the arm is pivoted to an outward position, represented by the dashed lines, so that as Play starts, the stylus is in a position to engage a start point of one of the grooves.

The arm is moved to the outward position during Rewind by applying an outward force thereto. The force may be applied directly to the arm by a pulled drawstring, or by an intermediary element, such as a positioning lever, as will be explained hereafter in connection with a preferred embodiment. During Play the arm moves toward the inner position as the stylus engages and follows one of the sound grooves from its start point at radius $r_1$ to its end point in circular groove 28.

In accordance with the teachings of this invention, in addition to the pivotal motion of the arm 12 about pivot 20, the rolling block 13 is capable of pivoting about pivot 14. Briefly stated, the rolling block 13 is shaped and supported by the arm 12 in such a way that only during Play is the stylus 15 directed to engage one of the grooves and follow therein to reproduce the saying recorded therein. The stylus 15 remains in such a position at the end of Play. However, once the Rewind cycle starts, the block is caused to pivot so as to disengage the stylus from the record and expose the blunt shoe 17 to be in contact with the record, as the arm is pivoted to its outward position. The relative position of the block 13 with respect to the tone arm 12 during Play is shown in the partial cross-sectional view of FIG. 3, while FIG. 4 represents a cross-sectional view of the block and tone arm when the shoe 17 is assumed to be in contact with the record surface. The block positions as shown in FIGS. 3 and 4 may be thought of as the Play and Clear positions, respectively.

In accordance with the present invention during and at the end of Play when the arm 12 reaches the inward position, the block is in the Play position and the stylus is in engagement in the circular groove 28. As the Rewind cycle begins, an outward force is applied to the arm to pivot it to the outward position while at substantially the same time the record starts to turn in the Rewind direction. As the record starts to turn counterclockwise, as represented by arrow 31, the stylus remains engaged in the groove. However, due to the record's rotation, the stylus starts to pivot about its sharp tip, applying a torque to the block, which causes the latter to pivot about pivot 14 from the Play position (FIG. 3) to the Clear position (FIG. 4). As a result, the stylus is disengaged from the record and the blunt shoe 17 rests on the record surface. The blunt shoe 17 remains in contact with the record surface as the arm is moved to its outward position, thereby preventing any likelihood of record scratching by the stylus during Rewind.

Figure 3:
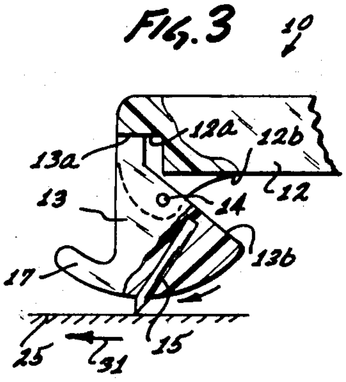
FIGS. 3 and 4 are partial side views in which a rolling block of the novel tone arm assembly is shown in Play and Clear positions, respectively.
Figure 4:
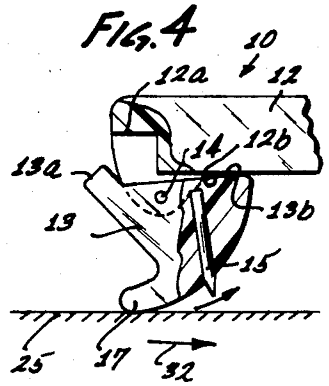

Once Play begins and the record starts to turn clockwise in the Play direction (arrow 32), the friction between the record and the shoe 17 is sufficient to cause the block 13 to pivot from the Clear position (FIG. 4) toward the Play position (FIG. 3). As it pivots, the stylus 15 touches the record surface, temporarily stopping the further rotation of the block to the Play position. The block 13 remains in this intermediate position, scuffing against the record which rotates in the Play direction, until the start point of a groove passes under the sharp tip of the stylus. When this happens as the record continuous to rotate, the sharp tip enters the groove and the block 13 completes its pivotal motion to the Play position, so that the stylus tip becomes fully engaged in the groove.

In the Play position, surface 13*a* of block 13 is biased against surface 12*a* of the tone arm 12, while in the Clear position, it is surface 13*b* of block 13 which is urged to abut surface 12*b* of the arm. Once the block is in the Play position with the stylus in engagement with the record in one of its grooves, the friction between the record which rotates in the Play direction and the stylus is sufficient to maintain the block in the Play position to insure proper engagement of the stylus with the record during Play to produce the necessary signals, needed for sound reproduction. At the end of Play, the block remains in the Play position until a subsequent Rewind cycle starts, as herebefore explained.

As seen from FIG. 1, the pivot 14 is not perpendicular to the arm's longitudinal axis, but rather forms an angle other than 90° therewith, to form a skewed pivot. Such pivot skewing is desirable to insure proper pivoting of the block 13 from the Play position to the Clear position in response to an outward force applied to the side of the tone arm, rather than as a result of the rotation of the record in the Rewind direction.

Figure 5:
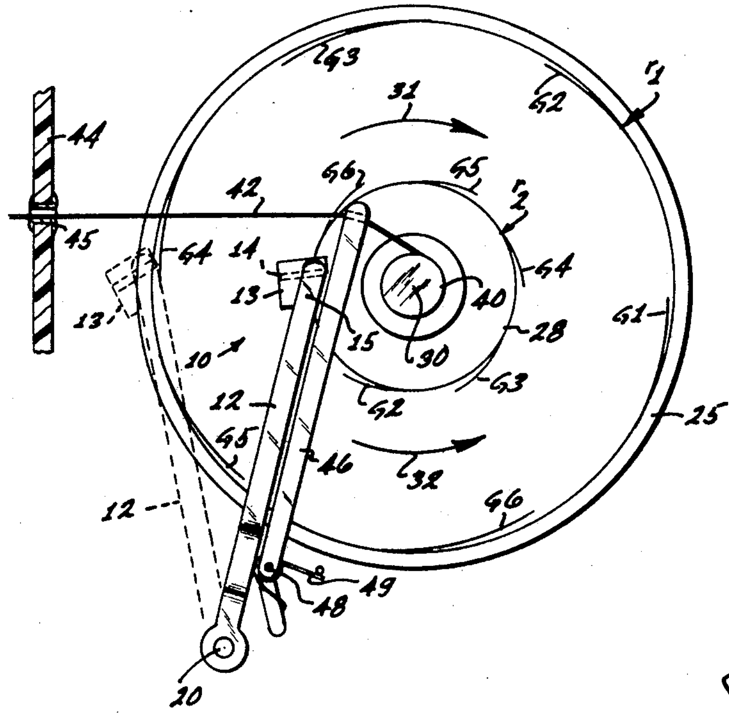
FIG. 5 is a top view of another embodiment of the invention, including a tone arm positioning lever.

Reference is now made to FIG. 5 in which elements like those previously described are designated by like numerals. Therein, numeral 40 designates a spindle which is assumed to support a turntable on which record 25 is mounted. One end of a drawstring 42 is connected to the spindle while the other end extends to the exterior of a toy housing 44 through an eyelet 45. A spiral rewindable power spring (not shown) is assumed to be connected to the spindle 40. The arrangement also includes a tone arm positioning lever, hereafter referred to as lever 46. The lever is mounted about a pivot 48. A biasing spring 49 is connected to the lever 46 to bias it to an inward position as shown in FIG. 5. The string 42 is designed to engage the lever 46 when the string is pulled to cause the lever 46 to pivot to an outward position.

As in prior art devices, the string 42, when pulled, performs a double function. One function is to rewind the power spring so that when the string is released the spring unwinds, thereby rotating, in the Play direction, the spindle 40 and more importantly, the record 25, supported on the spindle-mounted turntable. This function is performed in the arrangement shown in FIG. 5 in the same manner as in prior art devices. The other function of the string, when pulled, is to apply an outward force to the tone arm to pivot it from the inward position to the outward position so that the stylus is in a position to engage the start point of one of the record's grooves. Generally, in the prior art the string 42, when pulled, applies the outward side force directly to the tone arm after biasing it away from the record. However, in the present arrangement, in which the tone arm is assumed to be continuously biased toward the record, the outward side force is applied to the tone arm by the lever 46 as the latter is moved outwardly by the pulled string 42.

It should again be stressed that in the arrangement shown in FIG. 5 since the block 13 is supported in a skewed pivot, the block is pivotable from the Play position (FIG. 3) to the Clear position (FIG. 4) either by the force applied to the stylus by the record when the latter rotates in the Rewind direction and/or by the outward force which is applied to the tone arm by the lever 46, when the latter is forced to its outward position, as the string 42 is pulled. This insures clearing of the stylus from the record surface, to prevent record surface scratching, under the most adverse condition. Furthermore, this insures proper stylus clearing in a sound reproducing device of the type in which sayings are selected for reproduction by turntable indexing. In such a device a situation may arise in which the record is inhibited from rotating in the Rewind direction to sufficiently have fully rotated the block to the Clear position. However, by mounting the block on the skewed pivot, the outward side force, which the lever 46 applies to the arm, would provide the necessary added torque to the block to rotate it to its Clear position and thereby clear the stylus off the record, to prevent damage to its surface.

Summarizing the foregoing description, the novel tone arm assembly of the present invention includes a tone arm which is designed to pivotally support a rolling block, in which a stylus is fixedly positioned. The block is pivotable between a Play position in which the stylus is in engagement with a record in a groove thereof, and a Clear position in which the stylus clears the record and a blunt shoe of the block is in engagement with the record. The tone arm assembly forms part of a sound reproducing device in which the record is rotatable in a Play direction during Play and in a Rewind direction during Rewind. During Rewind, which occurs when a manually operated element such as a drawstring is pulled, the pulled string provides an outward side force to a lever which in turn applies an outward force to the tone arm to pivot it to an outward position.

At the end of Play, the block is in the Play position, with the stylus engaged in one of the grooves. As Rewind starts, the rotation of the record in the Rewind direction and/or the outward force applied to the tone arm, apply a torque to the block to pivot it to its Clear position, which it maintains as the arm is pivoted outwardly, and as long as the record does not rotate in the Play direction.

Once Play begins, which occurs when the drawstring is released, and the record starts to rotate in the Play direction, the friction between the blunt shoe of the block and the rotating record is sufficiently high to apply a torque to the block, causing it to pivot toward the Play position, thereby lowering the stylus toward engagement with the rotating record. As a groove of the record passes by the lowered stylus, the latter enters the groove, enabling the block to fully pivot to its Play position. It remains in said position during Play and thereafter until the initiation of a subsequent Rewind cycle.

Although particular embodiments of the invention have been described and illustrated herein, it is recognized that modifications and variations may readily occur to those skilled in the art. For example, the invention has been described in conjunction with a sound reproducing device in which the record is rotatable in a Rewind direction, and in which the tone arm is pivoted to the outward position by a manually pulled string. The present invention, however, is not limited for use in such a device. Clearly, the invention may be utilized in a sound reproducing device in which the record only rotates in a Play direction. Such is the case in a sound reproducing device in which the rotating energy is provided by an electric motor drive rather than a rewindable power spring. Also, the invention may be employed in any sound reproducing device in which the pivoting of the tone arm to the Start of Play position is achieved by any mechanical arrangement, not necessarily by a lever which is pulled by a pulled string.

I claim:

1. In a sound reproducing device for use in a toy or the like, the device being of a type including a movable record having recorded thereon at least one sound sequence in a selected continuous groove on said record, said groove having start and end points and means for moving said record in a Play direction and in a direction opposite thereto, an improved tone arm assembly comprising:

a tone arm biased toward said record;

stylus means, including a stylus for engaging said groove and for following therein from said start point to said end point when said record moves in said Play direction to provide signals representing the sound sequence recorded in the groove, said stylus means further including a block fixedly supporting said stylus and means pivotally coupling said block to said tone arm on an axis generally parallel to the surface of said record, said block being pivotable in response to the direction of movement of said record between a Play position in which said stylus thereon engages in said groove and a Clear position in which said stylus is clear of the record, a portion of said block resting on said record.

2. The arrangement as recited in claim 1 wherein said block has a blunt surface which is in frictional contact with said record when said block is in said Clear position.

3. The arrangement as recited in claim 2 wherein said block is pivotally mounted on said tone arm so that when said record moves in said Play direction frictional forces between said record and the blunt surface of said block, pivots said block from said Clear position to said Play position, with said stylus engaging said groove at substantially its start point, as said start point passes by said stylus.

4. The arrangement as recited in claim 3 wherein said tone arm defines a longitudinal axis and is pivoted for lateral movement across said record, said stylus means includes a pivot, about which said block pivots, said pivot between said block and tone arm being skewed with respect to said tone arm's longitudinal axis, so that when a lateral force is applied to said tone arm a force is thereby applied to said block to pivot it to its Clear position with the blunt surface of the block in contact with said record.

5. The arrangement as recited in claim 4 wherein said device includes a pullable string for moving said record in one direction, and said tone arm assembly further includes a positioning lever coupled to said string for applying said lateral force to said tone arm.

6. For use in a toy, a manually operable sound reproducing device of the type, including a record having recorded thereon at least one sound sequence in a continuous spiral groove, said groove extending from a start point to an end point, and sound reproducing means including a stylus engageable in said groove to reproduce the sound sequence recorded therein as said record is rotatable in a Play direction, an arrangement comprising:

first means for supporting said record for rotation in either a Play direction or in an opposite Rewind direction;

a pullable drawstring coupled at one end to said first means and having a second end extending to the exterior of said toy or the like, for rotating said first means and said record in said Rewind direction when said string is pulled, said first means and said record rotating in said Play direction when the pulled string is released;

a tone arm continuously biased toward said record;

first pivot means for pivotally supporting said tone arm adjacent said record, said tone arm being capable of pivoting between first and second arm positions;

a stylus;

a block, fixedly supporting said stylus and having a blunt surface portion adjacent the stylus which extends from said block;

second pivot means coupled to said tone arm for pivotally supporting said block with respect to the tone arm, said block being adapted to pivot between a Play position, in which said stylus points toward said record to be in engagement with said groove, and a Clear position in which the blunt surface of said block is in contact with said record and the stylus is inhibited from contacting said record;

said block being pivotally supported by said second pivot means so that when said tone arm is in said first arm position as said record is rotated in said Rewind direction, the record provides a force to pivot said block to said Clear position, said arrangement further including means responsive to the pulled string for providing a force to said tone arm to pivot it to its second position.

7. The arrangement as recited in claim 6 wherein said block is pivotally supported so that when said tone arm is at said second position, as the record starts rotating in said Play direction it applies a force to the blunt surface of said block to pivot it to its Play position.

8. The arrangement as recited in claim 7 wherein said second pivot means is skewed with respect to a longitudinal axis of said tone arm so that when a side force is applied to said tone arm to pivot it toward said second tone arm position, the frictional force between said stylus or said blunt surface and the record pivots the block to its Clear position.

9. The arrangement as recited in claim 8 wherein said means responsive to the pulled string is a pivotally mounted lever coupled to said string to provide a side force to said tone arm when the string is pulled to pivot the tone arm to its second position.

10. For use in a toy, a sound reproducing device of the type, including a record having recorded thereon at least one sound sequence in a continuous spiral groove, said groove extending from a start point to an end point, and sound reproducing means including a stylus engageable in said groove to reproduce the sound sequence recorded therein as said record is rotatable in a Play direction, an arrangement comprising:

first means for supporting said record for rotation in a Play direction;

actuatable means for rotating, when actuated, said first means and said record in said Play direction;

a tone arm continuously biased toward said record;

first pivot means for pivotally supporting said tone arm adjacent said record, said tone arm being capable of pivoting between first and second arm positions;

means for pivoting said tone arm to said second arm position;

a stylus;

a block, fixedly supporting said stylus and having a blunt surface portion adjacent the stylus which extends from said block;

second pivot means coupled to said tone arm for pivotally supporting said block with respect to the tone arm, said block being adapted to pivot between a Play position, in which said stylus points toward said record to be in engagement with said groove, and a Clear position in which the blunt surface of said block is in contact with said record and the stylus is inhibited from contacting said record;

said block being pivotally supported by said second pivot means so that when said tone arm is pivoted to said second position a force is applied to said block to pivot it to said Clear position, whereby said tone arm pivots to said second position with the blunt surface of said block in contact with said record.

11. The arrangement as recited in claim 10 wherein said block is pivotally supported so that when said tone arm is at said second position, as the record starts rotating in said Play direction it applies a force to the blunt surface of said block to pivot it to its Play position.

12. The arrangement as recited in claim 11 wherein said second pivot means is skewed with respect to a longitudinal axis of said tone arm so that when a side force is applied to said tone arm pivoting it toward said second tone arm position, the frictional force between said stylus or said blunt surface and the record pivots the block to its Clear position.